United States Patent [19]

Murata et al.

[11] Patent Number: 4,930,721

[45] Date of Patent: Jun. 5, 1990

[54] ROLL FILM DRIVING DEVICE

[75] Inventors: Shinji Murata, Tokyo; Masahiko Ito, Yokohama, both of Japan

[73] Assignee: Canon Kabushiki Kaisha, Tokyo, Japan

[21] Appl. No.: 158,658

[22] Filed: Feb. 22, 1988

[30] Foreign Application Priority Data

Feb. 27, 1987 [JP] Japan .................................. 62-42733
Feb. 27, 1987 [JP] Japan .................................. 62-42734
Feb. 27, 1987 [JP] Japan .................................. 62-42735

[51] Int. Cl.$^5$ .................... G11B 15/32; G11B 23/04; G03B 1/04
[52] U.S. Cl. .................................. 242/200; 242/68.3; 242/197; 242/201; 352/73; 352/78 R; 360/94
[58] Field of Search .................. 242/68.1, 68.3, 192, 242/197-207; 222/439, 447; 360/94; 352/72-74, 78 R, 78 C, 157

[56] References Cited

U.S. PATENT DOCUMENTS

| | | | |
|---|---|---|---|
| 2,998,206 | 8/1961 | Pendleton | 242/68.1 |
| 3,871,755 | 3/1975 | Wright | 242/68.3 X |
| 4,732,342 | 3/1988 | Mobius | 242/68.1 |
| 4,767,079 | 8/1988 | Saito et al. | 242/197 |

Primary Examiner—John Petrakes
Attorney, Agent, or Firm—Fitzpatrick, Cella, Harper & Scinto

[57] ABSTRACT

A roll film driving device is capable of accommodating different film cartridges housing reels of different coupling methods to a driving shaft and forwarding and reversing the reeled film by coupling the reel with the driving shaft. The driving shaft is provided with different coupling members respectively adapted to different reels of the film cartridges, wherein each coupling member is bound to the driving shaft in the rotating direction but is axially movable between a coupled position and a noncoupled position, and a coupling member matching the reel of the loaded cartridge is selected to make such movement.

23 Claims, 9 Drawing Sheets

ROLL FILM DRIVING DEVICE

BACKGROUND OF THE INVENTION

1. Field of the Invention

The present invention relates to a roll film driving device capable, for different film cartridges, of selecting coupler means matched with the type of reel employed in said cartridge, thereby coupling the reel with the driving shaft and enabling forward and reverse rotation of the reel.

2. Related Background Art

The roll film driving device as described above is utilized, for example, in the microfilm reader and reader-printer etc., used for retrieval, reading and/or printing of the images on a reeled microfilm.

In such apparatus there have been employed at least two types of cartridge, i.e. an ANSI (American National Standards Institute, Inc.) standard cartridge, and an M-type cartridge proposed by Minnesota Mining and Manufacturing Co.

In the ANSI standard cartridge, the coupling member of the reel to the driving shaft is provided with a square hole formed at the center of the reel and having a radially extended engaging groove at a point in the internal periphery thereof, and the transmission of driving torque is achieved by inserting a square driving shaft into said hole, or by using a shaft with an engaging piece matching said engaging groove.

In the M-type cartridge, the coupling member of the reel is provided with a cylindrical recess of a relatively large diameter, formed at the center of the reel and having a pin hole on the bottom of said cylindrical recess, at a predetermined distance from the center thereof. A pin formed on an end flange face of the driving shaft engages with said pin hole, when said shaft is rotated while said flange face is pressed against the bottom, thereby transmitting the driving torque.

The above-mentioned two cartridges have almost the same external dimensions, but are different in the coupling structure with the driving shaft for driving the film takeup reel, and in the driving method for film feeding. For this reason there has been used an exclusive equipment for each type of cartridge, or an equipment usable for both types by interchanging an end part of the driving shaft. Thus, the former lacks the interchangeability of the cartridges, while the latter requires a tedious procedure of replacing said end part.

For resolving the above-mentioned drawbacks the Japanese Laid-open Patent No. 231533/1986 proposed an apparatus in which a driving shaft for the M-type cartridge is provided, around the end portion thereof, with the driving flange for the ANSI standard cartridge, wherein both driving members are simultaneously movable in the axial direction while said flange is retractable against a spring pressure along the driving shaft away from the reel. Also a pressing member with a tapered end is positioned, on the axis of said driving shaft, at a distance required for loading a reel from the end of said shaft and is biased by a spring toward said driving shaft thereby elastically supporting said reel. The above-explained apparatus can therefore be selectively adapted to both cartridges.

However, the mechanism proposed in the Japanese Laid-open Patent No. 231533/1986 explained above is still associated with following drawbacks:

(1) In using the ANSI standard cartridge, the position of the reel in the cartridge is very unstable since it is determined by the balance between the spring pressures at the flange of the driving shaft and at the pressing member, so that the reel flanges often contact the internal walls of the cartridge. Thus, the rotation of reel is associated with friction and abrasion, eventually leading to defective reel rotation and erratic film feeding;

(2) In using the M-type cartridge, the pin on the driving flange engages with the pin hole formed on the bottom of the cylindrical recess of the reel to make the coupling, and the above-mentioned driving shaft, moving with said flange but not used in making said coupling, is accommodated in the space of the cylindrical recess of the reel. Consequently, the protruding length of said driving shaft, or the engaging length with the reel of an ANSI standard cartridge, is inevitably limited by the depth of the cylindrical recess of the reel of the M-type cartridge. In addition, since said driving shaft has a tapered end for facilitating the insertion into the reel of the ANSI standard cartridge, the effective engaging length of said shaft is further shortened to $\frac{1}{3}-\frac{1}{4}$ of the length of the central hole of the reel. For this reason the supporting of the reel greatly relies on the function of the supporting member at the opposite side. Consequently, the reel is apt to be inclined, whereby the reel flanges come in contact with the internal walls of the cartridge, thus inducing friction and abrasion and eventually leading to erratic film feeding as in the case of the ANSI standard cartridge;

(3) The driving flange for the M-type cartridge is biased by a spring provided on a hollow driving shaft for driving said flange, and a bearing cannot be provided for said hollowing driving shaft, as the external periphery thereof is utilized for said spring over a wide range. For this reason said hollow driving shaft has to be supported on one side only, and the resulting insufficient strength gives rise to the vibration of the center of said shaft.

SUMMARY OF THE INVENTION

An object of the present invention is to provide a roll film driving device which is not associated with the above-mentioned drawbacks but is capable, in a non-loaded state of the cartridge, of securing a sufficient space for cartridge loading without difficulty, and, in the loaded state of the cartridge, of realizing a coupling over a substantial portion of the length of the axial hole of the reel.

Another object of the present invention is to provide a roll film driving device capable, in either type of cartridge, of prohibiting abrasion of the reel and erratic film feeding.

The above-mentioned objects can be achieved, according to the present invention, by a roll film driving device capable of accommodating different film cartridges housing reels of different coupling methods to a driving shaft and forwarding and reversing the reeled film by coupling said reel with the driving shaft, comprising, on the driving shaft, different coupling members respectively adapted to different reels of the film cartridges, wherein each coupling member is bound to the driving shaft in the rotating direction but is axially movable between a coupled position and a non-coupled position, and a coupling member matching the reel of the loaded cartridge is selected to make such movement.

DETAILED DESCRIPTION OF THE PREFERRED EMBODIMENTS

Figure 1:
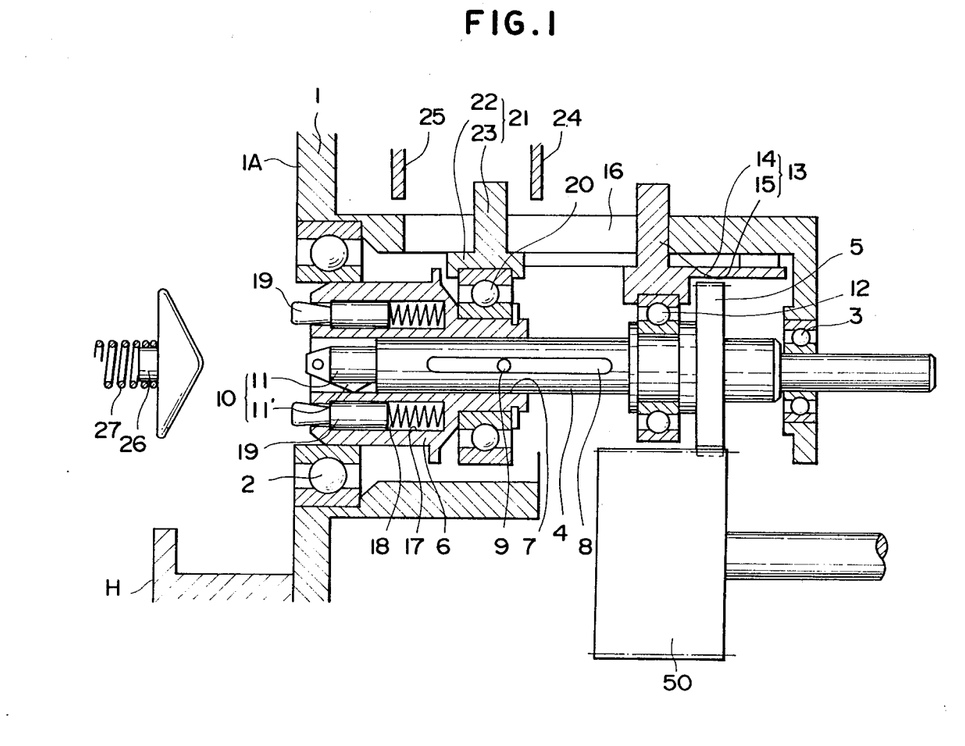
FIG. 1 is a cross-sectional view of a device embodying the present invention.

Now the present invention will be clarified in detail by embodiments thereof shown in the attached drawings. FIG. 1 is a cross-sectional view of a film driving device adapted for use in a microfilm reader-printer.

In FIG. 1, a driving shaft holder 1, fixed to the device, supports bearings 2, 3 at the left and right ends. A cartridge support H is provided to support cartridges A, M of different types at a predetermined position for use.

On the central axis of said bearings 2, 3 there is provided a driving shaft 4 provided with a gear 5 and rotated by a driving gear 50, which meshes with said gear 5 and is connected to an unrepresented motor. Said driving shaft 4 is axially slidably supported, with respect to the driving shaft holder 1, by the bearing 3 at the right-hand side, and, at the left-hand side, by the bearing 2 across a second coupling member for the M-type cartridge to be explained later.

Said driving shaft 4 is loosely inserted in a hollow hole 7 of the second coupling member 6, and a link pin 9 inserted into an elongated hole 8 formed on the driving shaft 4 engages with an unrepresented axial groove of said second coupling member 6, whereby said driving shaft 4 and said second coupling member 6 are mutually slidable in the axial direction and rotate integrally in the circumferential direction.

The end portion of the driving shaft 4 constitutes a first coupling member 10 for the ANSI standard cartridge. Said first coupling member 10 has a shaft portion 11 to be inserted into the coupling hole of the reel of the ANSI standard cartridge, said shaft portion being provided, on the periphery thereof, with an engaging piece 11' to engage with a groove formed on the internal periphery of said coupling hole. Said shaft portion 11 is formed with a length approximately equal to the length of the coupling hole of the reel, and has a tapered end.

At the left side of the gear 5, the driving shaft 4 is rotatably supported, with a first bearing 12, by a first movable member 13, which is guided, at a sliding portion 14 thereof, slidably by the driving shaft holder 1 in the axial direction. Said first movable member 13 is provided thereon with a lever-shaped projection 15, which protrudes from an axially extended window 16 of the driving shaft holder 1.

Said second coupling member 6 is provided with axial pin support holes 17 in at least two positions symmetrical to the axis, and, in each of said holes 17, a driving pin 19 biased to left by a spring 18 is housed in such a state that the end portion thereof protrudes from said hole. Said driving pins 19 are used for driving the reel of the M-type cartridge, and the distance of paired pins is selected equal to the radial distance of the pin holes or connecting holes of such reel. Said second coupling member 6 is supported, at the left side, axially slidably by the aforementioned second bearing 2 mounted on the driving shaft holder 1, and, at the right side, rotatably by a second movable member 21 through a third bearing 20. Said second movable member 21 is constructed in a similar manner as the aforementioned first movable member 13, and is provided with a sliding portion 22 and a projection 23. Said second movable member 21 is guided, at said sliding portion 22, slidably by the driving shaft holder 1 in the axial direction, and the projection 23 protrudes from the elongated window 16 of said holder 1.

Above said elongated window 16 of the driving shaft holder 1, there are provided a first stopper 24 and a second stopper 25 for respectively limiting the movement of the first and second coupling members 10, 6 when they are moved leftwards and reach predetermined coupling positions.

Also at a lateral position distant approximately by the width of the cartridge from a cartridge receiving face 1A constituting the left lateral face of said holder 1, there is provided a pressing member 26 biased by a spring 27 for supporting the cartridge at the loading thereof.

In the device of the present embodiment explained above, the cartridge is loaded in the following manner:

(1) Initially the first movable member 13 and the second movable member 21 are in stand-by positions at right, as shown in FIG. 1, so that the first coupling member 10 and the second coupling member 6 are both retracted from the cartridge receiving face 1A.

Figure 2:
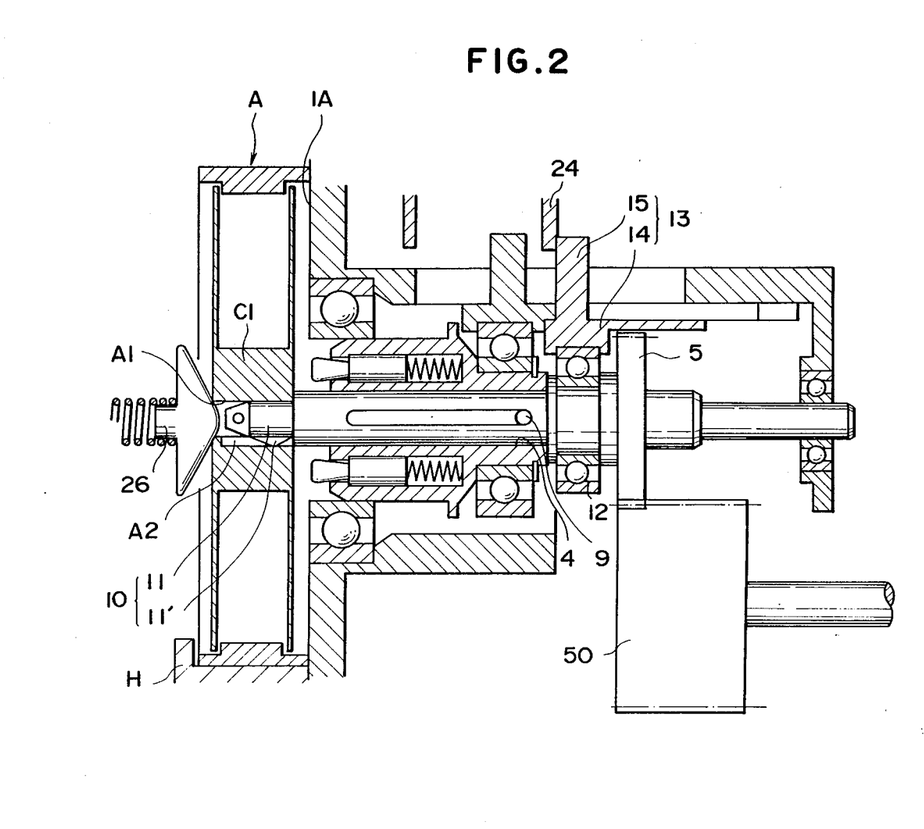
FIG. 2 is a cross-sectional view when an ANSI standard cartridge is loaded on the device shown in FIG. 1.

(2) A cartridge, for example the ANSI standard cartridge A is loaded from a direction perpendicular to the plane of drawing, as shown in FIG. 2, and then the first movable member 13 is advanced. Thus, while the cartridge A is supported by the pressure of the pressing member 26 from the left, the tapered end portion of the first coupling member 10 enters a shaft hole A1 of the reel. As the first coupling member 10 is rotated, the coupling piece 11' thereof engages with a groove A2 formed in a position of said shaft hole A1, and the coupling member enters further into said shaft hole A1. Finally, the projection 15 of the first movable member 13 comes into contact with the first stopper 24, and first coupling member 10 continues to rotate in the proper coupling position. Reference character indicates a film reel in the cartridge A.

Figure 3:
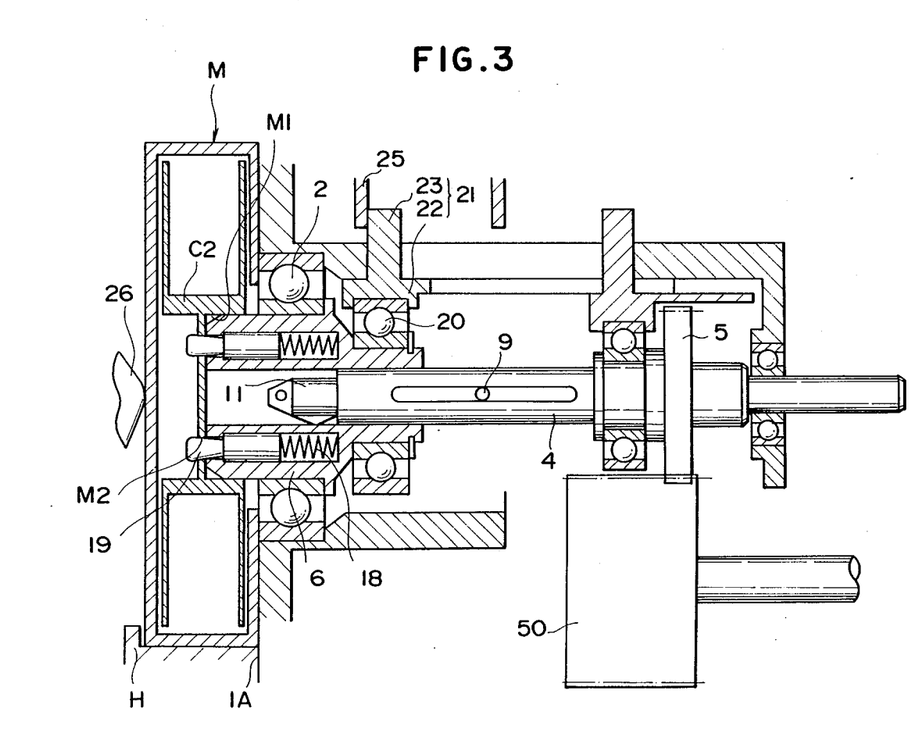
FIG. 3 is a cross-sectional view when an M-type cartridge is loaded on the device shown in FIG. 1.

(3) In case of loading an M-type cartridge, the first movable member 13 is retracted to the position explained in (1), and the M-type cartridge is loaded from a direction perpendicular to the plane of drawing. As explained in (2), the cartridge is pressed, by the pressing member 26, toward the cartridge receiving face 1A. In such situation, the second movable member 21 is moved to the left until it comes into contact with the second stopper 25, whereby the second coupling member 6 protrudes from the cartridge receiving face 1A and enters a cylindrical recess M1 of the reel. As paired driving pins 19 protrude from the second coupling member 6 under a spring pressure, and as said second coupling member 6 is rotated by the driving shaft 4 through the link pin 9, said driving pins 19 slide on the bottom of the cylindrical recess M1 and eventually engage with the pin holes M2. In this manner, the second coupling member 6 rotates the reel through said driving pins 19. Reference character C2 indicates a film reel in the cartridge M.

The device of the present embodiment can couple the driving shaft with an ANSI standard cartridge or an M-type cartridge as explained above, and the switching and movement of the first movable member 13 and the second movable member 25 for this purpose can be achieved by a mechanism explained in the following. The mechanism shown in FIG. 4 is same as that employed in FIG. 1 but is seen from above.

Figure 4:
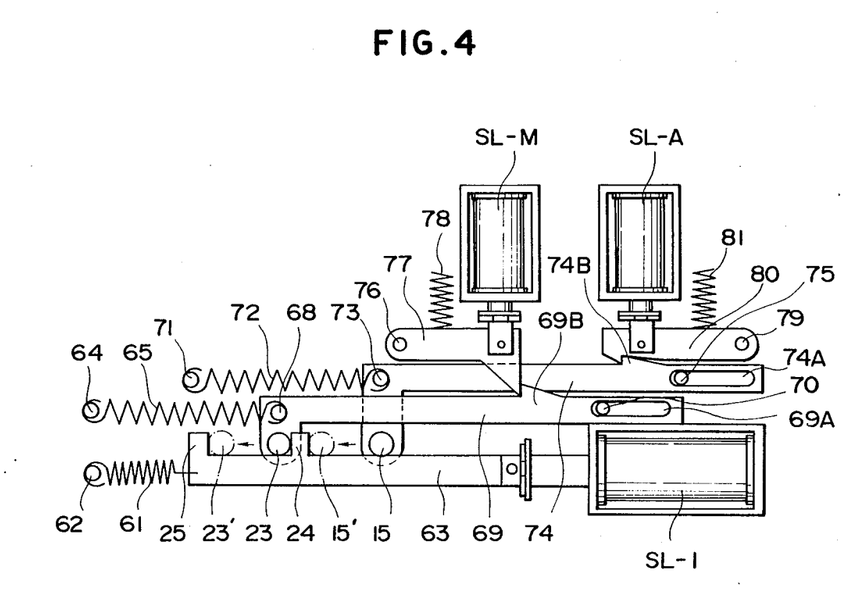
FIG. 4 is a cross-sectional view of a driving mechanism for a movable member employed in the device shown in FIG. 1.

In FIG. 4, the projection of the first movable member 13 is indicated by 15 while that of the second movable member 21 is indicated by 23, both in the non-coupled position. The coupled positions of said projections 15, 23 are respectively represented by 15', 23'.

A lever 63, having the first stopper 24 for the projection 15 of the first movable member and the second stopper 25 for the projection 23 of the second movable member, is biased frontwards or leftwards in the drawings, by a spring 61 supported by a fixed pin 62, to a predetermined position shown in FIG. 1, wherein said stoppers function properly, but can be retracted to the right against the tension of said spring 61, when a solenoid SL-1 is energized.

The projection 15 of the first movable member is formed as a shaft and is fitted to an end of a lever 74, which is biased to left by a spring 72 at the front portion, and, at the rear portion, is guided longitudinally by the combination of an extended hole 74A and a pin 75. Said lever 74 is also provided, in the middle thereof, with a latch 74B engaging with a claw lever 80 to be released from the engagement by means of the energization of a solenoid SL-A.

The projection 23 of the second movable member is operated by a mechanism similar to that for the projection 15 of the first movable member. Said shaft-shaped projection 23 is fitted on an end of a lever 69, of which a front portion is biased forward by a spring 65 and a rear portion is longitudinally guided by an elongated hole 69A engaging with a pin 70. Said lever 69 is also provided, at the middle thereof, with a latch 69B stopped by a claw lever 77 which is to be released by the energization of a solenoid SL-M.

In such a mechanism, when the solenoid SL-1 is energized, the first stopper 24 and the second stopper 25 of the lever 63 bring backward the projections 15, 23 of the first and second movable members, whereby the first coupling member 10 and the second coupling member 6 are retracted from the cartridge receiving face 1A as shown in FIG. 1. Then if the solenoid SL-A is energized, the latch 74B is released to advance the lever 74 by means of the force of the spring 72, whereby the first movable member 13 advances as shown in FIG. 2 to couple the first coupling member 10 with the reel of the ANSI standard cartridge. On the other hand, if the solenoid SL-M is energized, the latch 69B is released to advance the lever 69 by means of the force of the spring 65, whereby the first movable member 21 advances as shown in FIG. 3 to couple the second coupling member 6 with the reel of the M-type cartridge.

In the present invention, as explained in the foregoing, the coupling member for the ANSI standard cartridge and that for the M-type cartridge are made completely independently movable, so that the coupling member for a type never hinders the loading and coupling of the cartridge of the other type. Consequently, the driving shaft for the ANSI type can deeply enter the shaft hole of the reel, thereby ensuring film coupling and preventing inclined positioning of the reel. It is therefore rendered possible to prevent the friction and abrasion between the reel and the cartridge, and the defective film feeding.

Also the driving shaft can be supported on both sides by bearings, so that it is rendered possible to prevent vibration of the axis and to improve the strength, thus eventually achieving compactness of the device.

Besides the device of the present invention can be realized with a simple structure.

Figure 5:
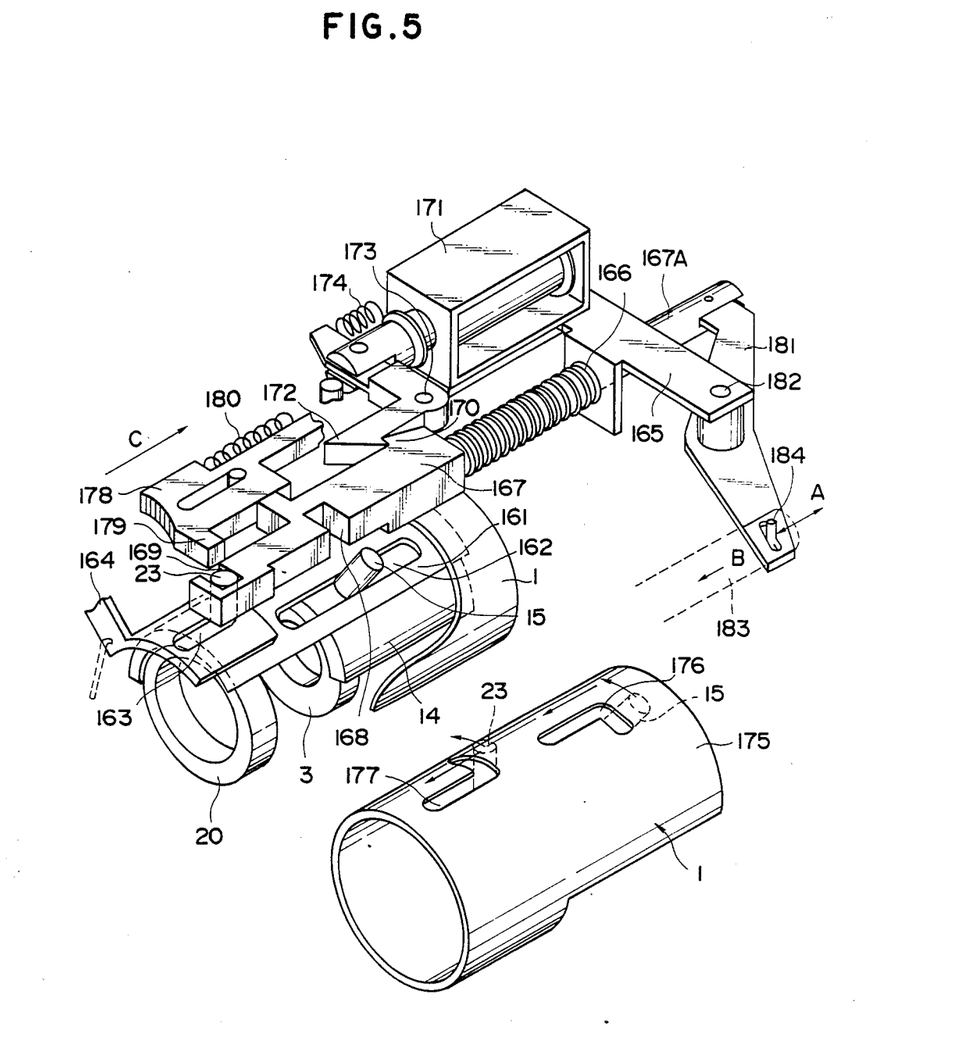
FIG. 5 is a perspective view of another embodiment of said driving mechanism.

FIG. 5 shows another embodiment of the driving mechanism for the movable members, wherein the switching and movement of the first movable member 13 and the second movable member 21 are achieved by a cam mechanism.

In FIG. 5, the projection of the first movable member 13 and that of the second movable member 21, respectively represented by 15 and 23, are both in non-coupled positions.

Said projections 15, 23 respectively engage with guide grooves 162, 163 formed on a switch plate 161 slidably movable between two positions on the periphery of the driving shaft holder 1. Said switch plate 161 is provided with a switch lever 164 for movement between said two positions on the periphery.

Above said switch plate 161 there is provided a driving block 167 biased forward (leftward in the drawing) by a compression spring 166 supported by a fixed frame 165. Said driving block 167 is provided, on the lateral sides thereof, with engaging grooves 168, 169 which respectively engage with the projections 15, 23 when said switch plate is displaced.

Said driving block 167 is further provided with a latch 170, which is locked by a claw lever 172 to be released by the energization of a solenoid 171. More detailedly said claw lever 172 is L-shaped and rotatably supported at the bent portion thereof by a fixed pin 173, so that it is retracted from the latch 170 against the function of a spring 174 when said solenoid 171 is energized.

The aforementioned switch lever 164 is positioned between said driving shaft holder 1 and the driving block 167. A cam portion 175 of said driving shaft holder 1 is provided with an inverted L-shaped cam groove 176 and an L-shaped cam groove 177, having circumferential groove portions for guiding said projections 15, 23 toward the engaging grooves 168, 169 and axial groove portions for guiding said projections toward the coupling positions.

Also said driving block 167 engages with a claw 179 of a manual return lever 178 for reversing said driving block. After the deactivation of said solenoid 171, said return lever 178 returns to an advanced position by means of the force of a compression spring 180. Also for enabling retraction by an electric signal, said driving block is articulated, at the rear end thereof, to an end of a driving lever 181, which is rotatably supported at the middle by a fixed pin 182 and is rotatably linked at the other end, by means of a pin 184, to a rod 183 of an unrepresented solenoid.

In the above-mentioned mechanism, in the non-coupled state, the driving block is retracted either by manually pushing the return lever 178 in a direction C against the force of the compression spring 180, or by energizing said solenoid to advance the rod 183 in a direction B thereby retracting the rod 167A through the driving lever 181 against the force of the spring 166. The retracted driving block 167 is locked in this position by the engagement of the latch 170 with the claw lever 172.

Then, in case of advancing the projection 15 of the first movable member for coupling the first coupling member 10 with the reel of an ANSI standard cartridge, the switch lever 164 is rotated counterclockwise and the solenoid 171 is energized, whereby the switch plate 161 is rotated counterclockwise to bring the projection 15 of the first movable member, supported by the guide groove 162 of said switch plate, into the engaging groove 168 of the driving block 167. The subsequent energization of the solenoid 171 releases the latch 170, whereby said projection 15 advances by the force of the spring 166 to bring the first coupling member 10 to the coupling position. In the above-described operations, the projection 15 at first moves circumferentially and then axially in the cam groove 176 of the fixed cam cylinder 175. Thus, said projection is prevented from an axial movement by the circumferential portion of the cam groove 176 before entering the engaging groove 168 of said driving block, and the axial movement is enabled by the axial portion of said cam groove 176 after entering said cam groove 176. On the other hand, the projection 23 of the second movable member does not engage with the engaging groove 169 of the driving block 167 but is positioned in the circumferential portion of the cam groove 177 in the cam cylinder 175, thereby being completely prevented from axial movement. Thus, in the forward movement of the first movable member 13, the second movable member 21 is securely prevented from the forward movement. On the other hand, in case of advancing the projection 23 of the second movable member 21, the projection 15 of the first movable member is retracted by reversing the return lever 178 or the rod 183 and the switch lever 164 is rotated clockwise, whereby the projection 23 of the second movable member alone is advanced in a similar manner as explained above.

In the embodiment shown in FIG. 5, the movement of the coupling members is achieved by cams, and the movable members are guided by an inverted L-shaped cam groove and an L-shaped cam groove, so that only one movable member can be moved. It is therefore possible to prevent the wrong coupling member from entering the coupling operation or to prevent the simultaneous movement of the two coupling members to the coupling position.

Figure 6:
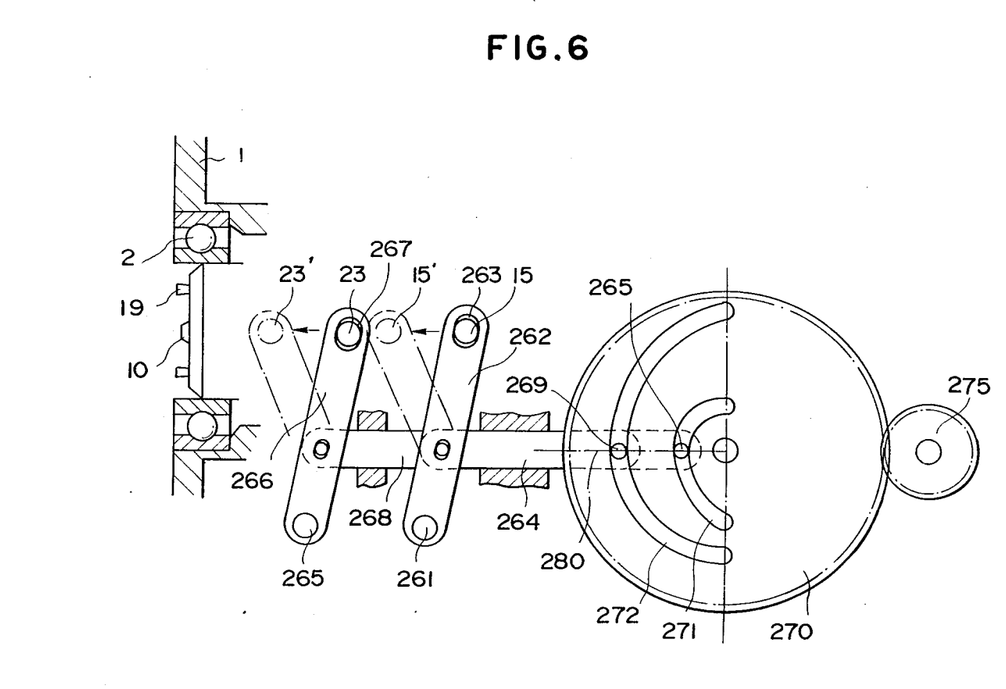
FIG. 6 is a plan view of still another embodiment of said driving mechanism.
Figure 7:
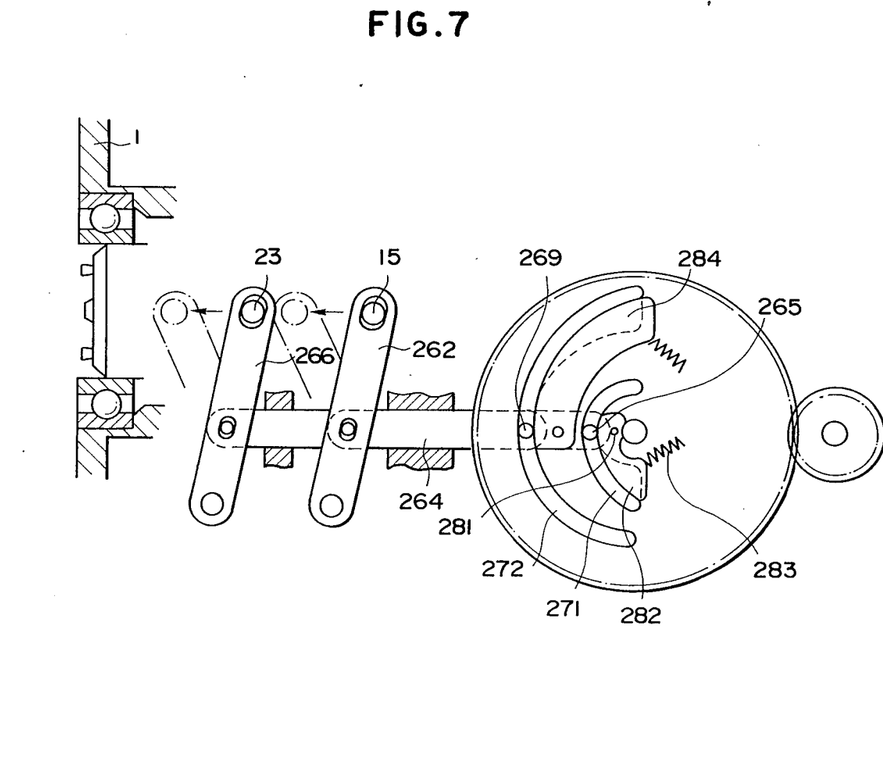
FIG. 7 is a plan view of a variation of the mechanism shown in FIG. 6.
Figure 8:
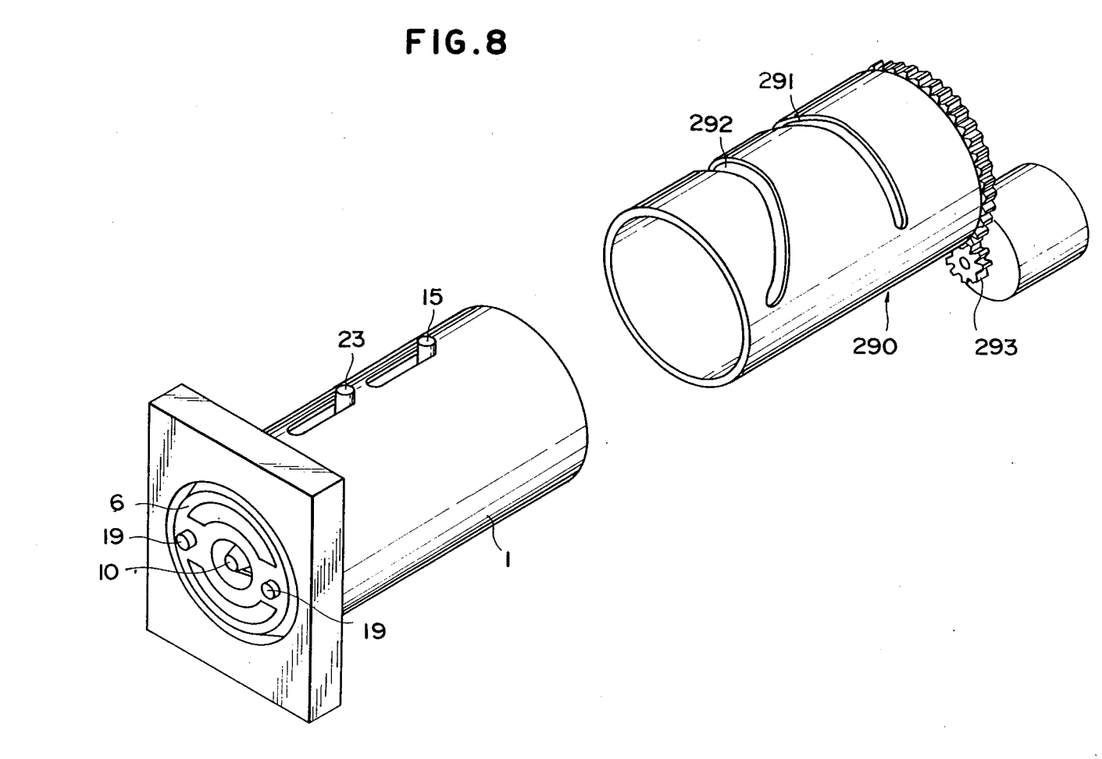
FIG. 8 is a perspective view of still another embodiment of the driving mechanism.

FIGS. 6 to 8 show still other embodiments of the mechanism for driving the movable members.

In FIG. 6, the projections of the first movable member 13 and the second movable member 21, respectively indicated as 15 and 23, are both in the non-coupled position. The coupling positions of said projections 15, 23 are respectively indicated by 15', 23'.

The projection 15 of said first movable member is loosely fitted in an elongated hole 263 at an end of a lever 262 which is rotatably supported by a fixed pin 261 and is articulated at the middle thereof to an end of a rod 264. Said rod 264 engages, by a pin 265 at the other end, with a cam groove 271 of a cam 270.

On the other hand, the projection 23 of said second movable member is fitted in an elongated hole 267 at an end of a lever 266 which is rotatably supported by a fixed pin 265 and is articulated at the middle thereof to an end of a rod 268. Said rod 268 engages, by a pin 269 at the other end, with a cam groove 272 of said cam 270.

Said cam grooves 271, 272 are extended over a central angle of the cam 270. The groove 271 runs, from the central position 280 thereof, with a constant radius clockwise but with an increasing radius counter clockwise. The other groove 272 runs, from the central position 280 thereof, with a constant radius counterclockwise but an increasing radius clockwise. The cam 270 meshes with a driving gear 275 reciprocated over a predetermined angle, thereby reciprocating over an angle of 180°.

In the above-explained mechanism, when an ANSI standard cartridge is loaded, a corresponding signal rotates the driving gear 275 counterclockwise, whereby the cam 270 meshing therewith is rotated clockwise to move the pin 265 engaging with the cam groove 271 and the rod 264 to left. Thus the lever 262 is rotated counterclockwise to advance the projection 15 of the first movable member 13 to a chain-lined position 15', thereby making the coupling operation of the first coupling member 10 for the ANSI standard cartridge.

When an M-type cartridge is loaded, a corresponding signal rotates the cam 270 counterclockwise, and the second coupling member 6 makes the coupling in a similar manner.

FIG. 7 shows a mechanism which provides improved reliability over the mechanism shown in FIG. 6. The mechanism shown in FIG. 7, different in cam structure, does not force the coupling member to move to the coupling position in the presence of a mechanical failure.

The cam groove 271 for moving the projection 15 of the first movable member is formed, in an area of counterclockwise rotation from the central position 280, with an outer rim of increasing radius and an inner rim of a constant radius, and, in said area there is provided a guide member 282 rendered rotatable about a pin 281. Said guide member 282 is biased by a spring 283 toward the cam groove 271, and is maintained in contact with the pin 265 of the rod 264 at an outer rim of a form concentric with said cam groove, thereby guiding said pin 265 along the outer rim of said cam groove. Owing to the provision of such guide member 282, the rod 264 is usually guided along the outer rim of the cam groove 271, but, if the first coupling member 10 cannot be advanced due to some mechanical trouble, the guide member 282 is pressed against the function of the spring 283 so that the pin 265 can reach the inner rim of the cam groove 271. In this manner, the first coupling member 10 is retracted, the damage or trouble resulting from forced movement can be prevented. In this embodiment it is also possible to dispense with the levers 262, 266 and to move the projections 15, 23 directly with the rod 264.

A guide member 284, similar to the guide member 282, is provided in the area of clockwise rotation from the central position 280 on the other cam groove 272, thereby protecting the second coupling member 6.

The flat cam in the foregoing embodiments may be replaced by a cylindrical cam as shown in FIG. 8. A cylindrical cam 290, having cam grooves 291, 292 corresponding to the projections 15, 23 of the first and second movable members, is fitted on a cylindrical portion of the driving shaft holder 1 from which said projections project, and is reciprocated in rotation by a gear 293 as shown in FIG. 8. Also the structure shown in FIG. 7 may be adopted in such cylindrical cam.

FIG. 8 shows a state in which the cylindrical cam 290 is separated from the driving shaft holder 1.

It is also possible to detect the type of the loaded cartridge by detector means, and to automatically drive a movable member corresponding to the type of cartridge in response to an output signal of said $ detector means. For example the solenoid SL-A or SL-M shown in FIG. 4 may be energized in response to the output signal of said detector means.

Said detector means, for example, may be composed of a microswitch for detecting the difference in the shape of cartridge so as to discriminate the type of cartridge.

The above-mentioned film is not limited to a microfilm but can be any other belt like material or member. Also the container housing said film is not limited to the cartridges of two types but can be any other cartridges or cassettes.

Figure 9:
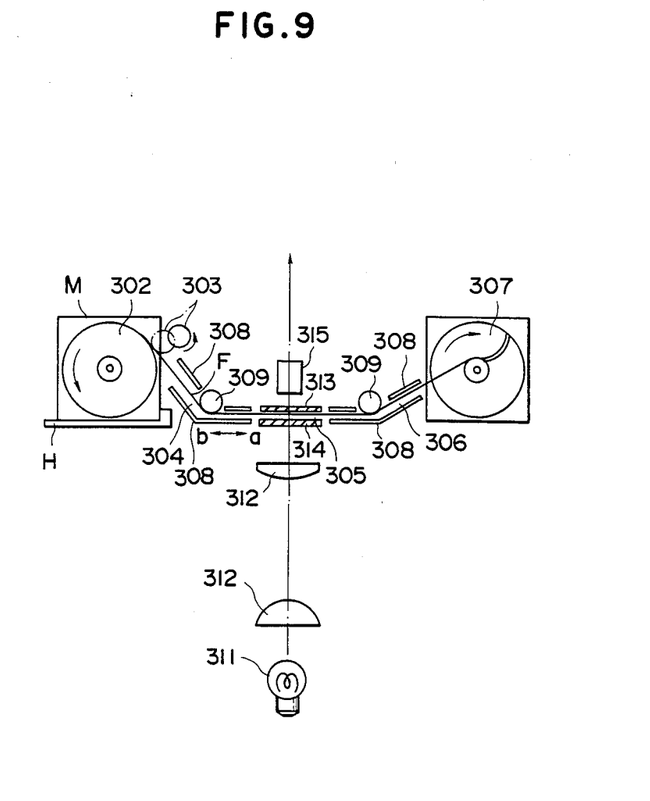
FIG. 9 is a schematic view showing the principal portion of a reader-printer employing the device of the present invention.

FIG. 9 schematically shows a film reader printer employing the film driving device of the present invention, wherein an M-type cartridge M is supported on a cartridge holder H of said film driving device. The film is wound on a reel 302 of said cartridge M, and the above-mentioned second coupling member is coupled with the hole of said reel. There are also shown a film feeding roller 303 movable between a full-lined position and a broken lined position; film paths 304, 305, 306 composed of film guide plates 308 and film guide rollers 309.

The film path 305 is formed by transparent glass plates 313, 314. There are also shown a film takeup reel 307; a film illuminating lamp 311; a condenser lens 312; and projection lens 315. The film F is driven in the forward or reverse direction by the rotation of the takeup reel 307 or the reel 302 of the type cartridge. The image on the film illuminated by the lamp 311 is projected by the projection lens 315 in an enlarged size on a screen or in a printer unit.

We claim:
1. A roll film driving device comprising:
a driving shaft;
support means for supporting selectively at a predetermined position one of at least two film cartridges which differ in shape from each other in the manner in which they couple with said driving shaft;
coupling means for coupling said driving shaft with each of said film cartridges, said coupling means including a first coupling member being capable of coupling with a first type film cartridge placed at the predetermined position and a second coupling member being capable of coupling with a second type film cartridge placed at the predetermined position, said first and second coupling members movable between a coupled position and a non-coupled position;
moving means for moving said first and second coupling members to the coupled position and the non-coupled position, respectively;
a first lock means for locking the first coupling member to the non-coupled position;
a second lock means for locking the second coupling member to the non-coupled position; and
release means for releasing selectively one of the first and second coupling members from a locked state thereof, only one of the coupling members released by the releasing means being movable to the coupled position.

2. A roll film driving device according to claim 1, wherein said moving means includes a first driving means for moving said first coupling member between the coupled position and the non-coupled position, a second driving means for moving said second coupling member between the coupled position and the non-coupled position, and drive control means for driving selectively said first and second driving means.

3. A roll film driving device according to claim 1, wherein said first coupling member is integrally rotatable with said driving shaft and is axially movable with respect to thereto, and said second coupling member is integrally rotatable with said driving shaft and is axially movable independently from said driving shaft.

4. A roll film driving device according to claim 1, further comprising a firs bearing and a second bearing; and
wherein said driving shaft is supported by said first bearing, said second coupling member is formed concentrically with said driving shaft and is supported by said second bearing.

5. A roll film driving device according to claim 4 wherein said first and second bearings are moveable in the axial direction of said driving shaft.

6. A roll film driving device according to claim 5, wherein said first bearing, said driving shaft and said first coupling member are integrally moved by said moving means, said second baring and said second coupling member are integrally moved by said moving means.

7. A roll film driving device according to claim 4, further comprising a third bearing for supporting said second coupling member rotatably and movably in an axial direction along said driving shaft, and said third bearing being positioned closer to said support means than said second bearing and not being axially movable.

8. A roll film driving device according to claim 7, wherein said second bearing is axially movable integrally with said second coupling member.

9. A roll film driving device according to claim 1, further comprising an axial movable bearing, and
wherein each coupling member is supported by said axially movable bearing along said driving shaft, and moves between the coupled position and the non-coupled position by the axial movement of its respective bearing.

10. A roll film driving device according to claim 1, further comprising a driving unit including a first gear and a second gear, wherein said driving shaft is rendered axially movable and is disposed such that said second gear meshes with said first gear of said driving unit, and said second gear is adapted to move in a same direction together with the axial movement of said driving shaft.

11. A roll film driving device according to claim 1, further comprising a first bearing for supporting rotatably and axially movably said driving shaft, a second bearing for supporting rotatably and axially movably one of said coupling members, said one of sid coupling members being arranged around said driving shaft, and the other coupling member being arranged concentrically with sid driving shaft.

12. A roll film driving device according to claim 11, wherein said first bearing is arranged in the vicinity of one end of said driving shaft, said second bearing and each coupling member are arranged in the vicinity of the other end of said driving shaft.

13. A roll film driving device according to claim 11, wherein said moving means comprises a cam member having at least two slots, a first member engaging with one of sid slots and operably associated with said first coupling member, and a second member engaging with the other of said slots and operably associated with the second coupling member.

14. A roll driving device according to claim 13, wherein said cam member is adapted to rotate in the forward and reverse directions, and the forward rotation of sid cam member moves said first and second coupling members, respectively, to the coupled position and the non-coupled position, the reverse rotation of said cam member moves said first and second coupling members, respectively, to the non-coupled position and the coupled position.

15. A roll film driving device according to claim 1, wherein
the first lock means having a first engaging portion which is engageable with the first coupling member, the second lock means having a second engaging portion which is engageable with the second coupling member, the first and second engaging portions being provided on a lock member which is reciprocally movable, by a forward movement of the lock member the first coupling member being engaged with the first engaging portion and the second coupling member being released from the second engaging portion so that only the second coupling member is released from its locked state, and by a reverse movement of the lock member the second coupling member being engaged with the second engaging portion and the first coupling member being released from the first engaging portion so that only the first coupling member is released from its locked state.

16. A belt driving device utilizing a container housing a belt-like member wound on a core, comprising:
a driving shaft for rotating said core;
support means for supporting insertably and detachably one of at least two containers which differ in shape from each other in the manner in which they couple with said driving shaft;
a first coupling member for drivingly connecting a first type container with said driving shaft;
a second coupling member for drivingly connecting a second type container with sid driving shaft;
moving means for moving said first and second coupling members between a coupled position in a container inserting path of said support member and a non-coupled position apart from said inserting path;
locking means for locking said first and second coupling members at the non-coupled;
release mans for releasing selectively one of the first and second coupling members locked by the locking means from a locked state, said moving means moving only said released one of the coupling members to the coupling position.

17. A device according to claim 16, wherein said driving shaft is rotatably and axially movably supported, said first coupling member is operably associated with said driving shaft to move axially, and said second coupling member is axially moved independently from the axial movement of the shaft.

18. A device according to claim 17, further comprising:
a first supporting member for rotatably supporting said driving shaft and being axially movable;
a second supporting member for rotatably supporting said second coupling member and being axially movable;
said first and second supporting members being locked at a predetermined position by said locking means, and thus only a selected one of coupling members is released from the locked condition.

19. A device according to claim 18, wherein said first and second supporting means comprise first and second bearings.

20. A device according to claim 17, wherein said first coupling member is provided at an end of said driving shaft to engage with an opening of the core of the first type container and rotates together with said driving shaft;
said second coupling member has a pin at its end to engage with an opening of the core of the second type container and rotates together with said driving shaft.

21. A process device according to claim 16, wherein said belt-like member is microfilm, and the device further comprises an illuminating means for illuminating the microfilm an optical means for projecting an image recorded on the microfilm and illuminated by the illuminating means, feeding means for feeding microfilm stored in a container to a winding portion between the illuminating means and the optical means.

22. A process device according to claim 16, further comprising selection means for selecting one of the first and second coupling members which is to be locked.

23. A film projecting device comprising:
a driving shaft;
a first coupling member provided at one end of said driving shaft and being capable of coupling with a first type cartridge including a reel around which film is wound;
a second coupling member arranged along a periphery of said driving shaft and being capable of coupling a second type cartridge including a reel around which film is wound, said second coupling member being rotatively driven by said driving shaft;
moving means for moving selectively one of the first and second coupling members between a coupled position and a non-coupled position;
a first bearing supporting rotatably the driving shaft;
a second bearing supporting rotatably the second coupling member;
said first and second bearings being movable in the axial direction of the driving shaft;
said first bearing, said driving shaft and said first coupling member being integrally moved by said moving means, said second bearing and said second coupling member being integrally moved by said moving means;
feeding means for feeding film in the cartridge placed at the predetermined position to outside of the cartridge;
optical means for projecting an image recorded on the film.

* * * * *

UNITED STATES PATENT AND TRADEMARK OFFICE
CERTIFICATE OF CORRECTION

PATENT NO. : 4,930,721
DATED : June 5, 1990
INVENTOR(S) : Murata, et al.

It is certified that error appears in the above-identified patent and that said Letters Patent is hereby corrected as shown below:

COLUMN 2:

Line 34, "hollowing" should read --hollow--.

COLUMN 4:

Line 56, "character" should read --character C1--.

COLUMN 6:

Line 17, "Besides" should read --besides,--.

COLUMN 9:

Line 10, "$" should be deleted.

UNITED STATES PATENT AND TRADEMARK OFFICE
CERTIFICATE OF CORRECTION

PATENT NO. : 4,930,721

DATED : June 5, 1990

INVENTOR(S) : Murata, et al.

It is certified that error appears in the above-identified patent and that said Letters Patent is hereby corrected as shown below:

COLUMN 10:

Line 15, "to" should be deleted.

Line 19, "firs" should read --first bearing--.

Line 25, "claim 4" should read --claim 4,--.

Line 26, "moveable" should read --movable--.

Line 31, "baring" should read --bearing--.

Line 62, "sid" should read --said--.

Line 65, "sid" should read --said--.

COLUMN 11:

Line 6, "sid" should read --said--.

Line 13, "sid" should read --said--.

Line 29, "lock member" should read --lock member,--.
Line 34, "lock member" should read --lock member,--.

Line 50, "sid" should read --said--.

Line 57, "non-coupled" should read --non-coupled position;--.

UNITED STATES PATENT AND TRADEMARK OFFICE
CERTIFICATE OF CORRECTION

PATENT NO. : 4,930,721

DATED : June 5, 1990

INVENTOR(S) : Murata, et al.

Page 3 of 3

It is certified that error appears in the above-identified patent and that said Letters Patent is hereby corrected as shown below:

COLUMN 12:

Line 29, "microfilm an" should read --microfilm, an--.

Line 63, "to" should be deleted.

Line 64, "cartridge;" should read --cartridge; and--.

Signed and Sealed this

Eighteenth Day of August, 1992

Attest:

DOUGLAS B. COMER

Attesting Officer

Acting Commissioner of Patents and Trademarks